Patented May 26, 1925.

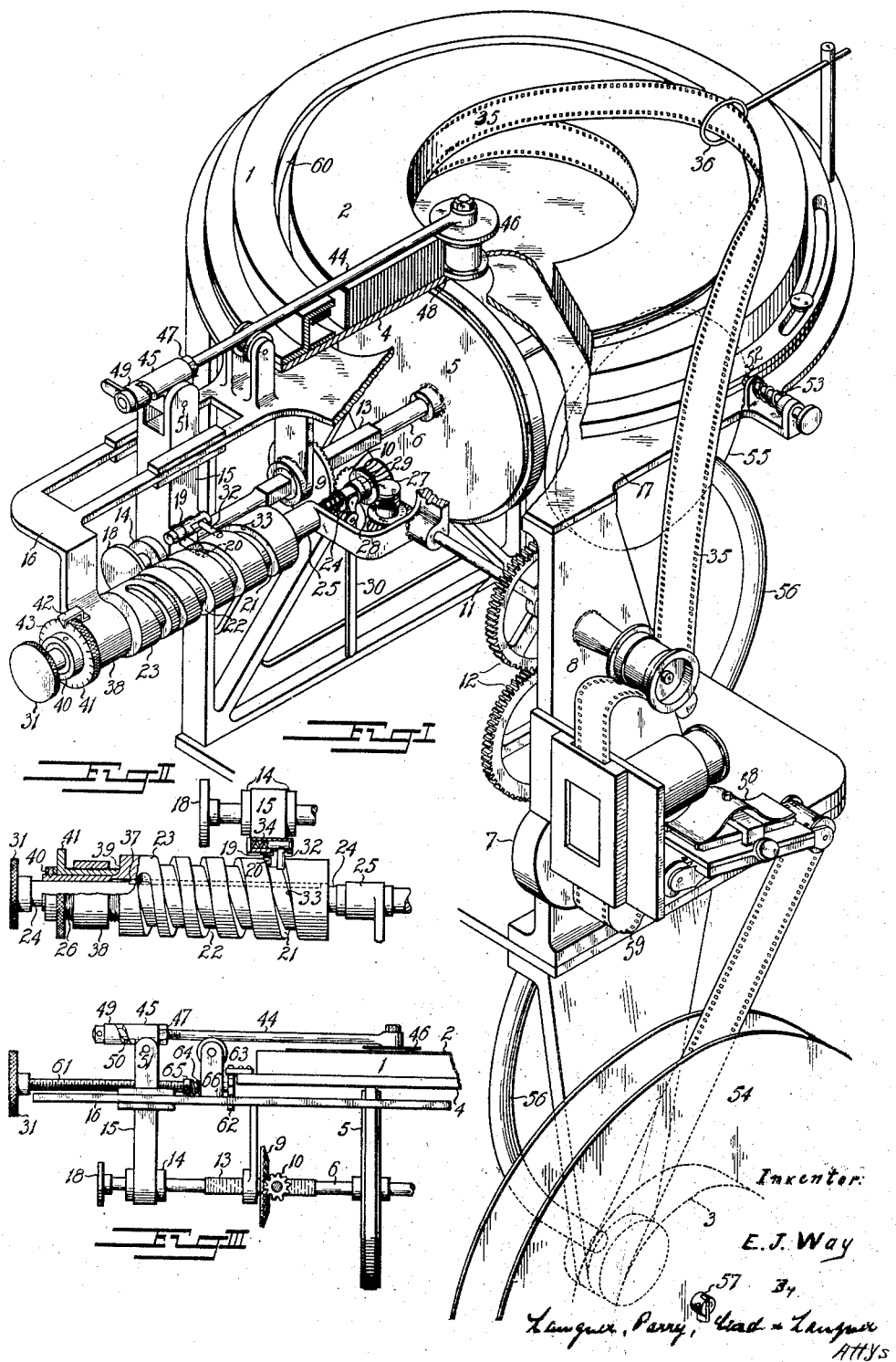

1,539,224

UNITED STATES PATENT OFFICE.

EDWARD JOHN WAY, OF JOHANNESBURG, TRANSVAAL, SOUTH AFRICA, ASSIGNOR TO BIOSCOPE IMPROVEMENTS LIMITED, OF JOHANNESBURG, TRANSVAAL, UNION OF SOUTH AFRICA, A COMPANY OF TRANSVAAL, SOUTH AFRICA.

FILM DELIVERING OR WINDING APPARATUS SUITABLE FOR CINEMATOGRAPHS.

Application filed September 14, 1922. Serial No. 588,258.

*To all whom it may concern:*

Be it known that EDWARD JOHN WAY, a British subject, residing at Cullinan Buildings, Simmonds St., Johannesburg, Transvaal Province of the Union of South Africa, has invented certain new and useful Film Delivering or Winding Apparatus Suitable for Cinematographs, of which the following is a specification.

The present invention has reference to arrangements for delivering or winding film, in cinematograph and other apparatus, of the kind in which a rotatable film carrier is in driving connection with the film feeding mechanism of the cinematograph, through continuously variable speed gear the velocity ratio of which is progressively changed to cause the angular speed of the carrier to vary with the diameter of the point on the film coil from, or at which, film is being delivered or wound.

The object of the invention is to provide positively driven apparatus of simple construction which enables the linear rate of winding or delivery of film to be maintained very accurately in consonance with its linear rate of movement by the feed mechanism of the projector or equivalent apparatus.

The invention has particular reference to apparatus as described above in which the carrier for the film coil is driven by a friction wheel rotating at a fixed speed ratio in relation to the gate feed mechanism of the projector or the like; said friction wheel being traversable radially of the carrier to vary the angular speed of the carrier correspondingly with the variation in diameter of the point of the coil thereon at which film is being delivered or wound; and in which the radial traverse of the friction wheel is controlled by mechanism positively connected for movement with the friction wheel or the gate feed mechanism or the like.

The invention is illustrated in the accompanying drawings in which:—

Fig. I is a perspective view of a cinematograph projector embodying the invention.

Fig. II is an enlarged plan of a detail thereof.

Fig. III is a partial elevation of an alternative form of apparatus.

The invention is illustrated as applied to the unused coil carrier 1 of a non-rewind device in which film is delivered from the interior of the unused film coil 2 and is wound on to the exterior of the used film coil 3; but it is also applicable to delivery from the exterior of the unused coil and to winding on to either the interior or exterior of the used coil.

The unused coil carrier 1 is shown as horizontally disposed and formed with a machined undersurface 4 forming a friction disc. Co-operating with said friction disc 4 is a friction wheel 5 the shaft 6 of which is radially disposed with regard to the friction disc. Said shaft 6 is in positive driving engagement with the film feed mechanism 7 of the projector 8, by means of gearing 9, 10, 11, 12. The shaft 6 and wheel 5 are together movable radially of the friction disc 4 to vary the angular speed of the coil carrier 1; the shaft being splined at 13 to retain driving engagement with the bevel wheel 9 whilst sliding through the same.

Such apparatus is known in which the rate of radial movement of the friction wheel 5 is in fixed ratio to the velocity of the feed mechanism 7 or what is the same thing, the shaft 6; as, for example, by traversing the friction wheel by means of a feed screw connected to rotate positively with the shafts 6 or 10. Such an arrangement, however, can only approximate roughly to the desired result. Every revolution of the carrier 1 winds out one convolution of film and the friction wheel 5 accordingly requires to be advanced by one film thickness for each such revolution. The rate of revolution of the carrier 1, however, varies relatively to the rate of revolution of the friction wheel 5, according to the radial position of the latter; and the rate of radial feed of the friction wheel 5 must correspondingly vary relatively to its own rate of revolution, and according to its radial position on the friction disc 4. That is to say, the greater the distance of the friction wheel 5 from the centre of the friction disc 4, the less should be its rate of radial feed.

The present invention consists in apparatus as described in which the velocity of the carrier 1 varies substantially by equal increments for each revolution of the carrier; that is to say, when a radial friction wheel 5 is employed, in which the rate of radial feed of the friction wheel is based on the rate of rotation of the carrier 1, and varies in relation to the rate of rotation of the friction wheel.

In carrying out the invention as shown in Figs. I and II, collars 14 on the shaft 6 engage with a carriage 15 which slides on a radial extension 16 of the machine frame 17, so that said carriage 15, the shaft 6 and the friction wheel 5, move radially together. A pressure head 18 is fitted at the end of the shaft 6. A pin 19 projecting from the carriage 15 and carrying an anti-friction roller 20 engages the leading edge 21 of a groove 22 cut in a drum 23. The shaft 24 of said drum 22 is rotatably mounted in bearings 25, 26 on the frame 17 and is rotated from the shaft 11 through worm gearing 27 which causes the drum to rotate relatively slowly.

The gearing 27 drives the shaft 24 through a spring engaged clutch 28, the elements of which engage one another by means of a large number of small radial teeth 29, so that the clutching-in movement does not perceptibly affect the angular position of the drum; in other words a clutch so arranged approximates to a friction clutch in effecting engagement at any relative angular postions of the driving and driven members, whilst it is free from slip. A lever 30 is provided for releasing the clutch; and when it is thus released the drum 23 can be rotated independently of its driving gear 27. For so rotating it, the shaft 24 is fitted with a hand wheel 31.

The anti-friction roller 19 is of less diameter than the width of the groove 22, so that it can rotate freely therein. For keeping the roller in contact with the leading edge 21 of the groove there is provided on the carriage a pin 32 which is pressed against the trailing-edge 33 of the groove by a spring 34. This spring arrangement is-employed also for permitting a rapid temporary inward shifting of the friction wheel 5 as hereafter described. Fundamentally the groove 22 is a helix, the pitch of which regularly decreases from the end nearest the centre of the carrier 1, in such a manner as to advance the carriage 15 by one film thickness for each revolution of the carrier 1. In practice, however, it is usually necessary to guide the outgoing loop 35 of film by a fixed device such as the ring 36, and to compensate for the continually increasing distance between said ring 36, and the point of departure of the loop 35 from the interior of the coil, and for other reasons, the pitch of the groove is generally not strictly as suggested above. It can be found empirically by causing a stylus on the carriage 15 to form a trace on the ungrooved drum 23, whilst the travel of the carriage 15 is being controlled by another device which causes film to be delivered in the desired manner, such, for instance, as is described in the specification of my prior Patent No. 1,415,131.

The drum 23 is connected to the shaft 24 by a spline 37 which permits it to be adjusted longitudinally of said shaft. Such adjustment is effected by means of the bearing 26 which is screwed into the bearing boss 38 and engages the drum by the shoulder 39 and the collar 40. The bearing is provided with a hand wheel 41 for rotating it; and a fixed pointer 42 co-operates with the division marks 43 on said wheel 41 for indicating the radial position of the drum 23. The effect of rotating the hand wheel 41 is to shift the drum 23, carriage 15 and friction wheel 5 together in a radial direction, so that the position of the friction wheel is altered in relation to the inner convolution of the coil 2, but the relative positions of the drum and friction wheel are not altered.

An important adjunct of the apparatus is a device for rapidly and accurately setting the position of the carriage 15 and friction wheel 5 according to the inner diameter of the coil 2 of film on the carrier 1. This consists of an arm 44 mounted in a head 45 pivoted to the top of the carriage 15 and carrying at its end a roller 46 which passes within the coil 2. The arm 44 can slide longitudinally through the head 45, and is fitted with a nut 47 forming an accurately adjustable stop to limit its outward movement. Said stop is so adjusted that when it is in contact with the head 45 the peripheral point 48 of the roller 46 is vertically above the centre of the friction wheel 5. A quick acting cam 49 on the arm 44, co-operating with a cam surface 50 on the head 45 enables the stop 47 to be quickly brought against the head 45 or released therefrom. The pivot 51 enables the arm 44 to be raised clear from the carrier 1, when necessary.

52 indicates a brake which can be manually pressed to the carrier 1 to decrease the speed of the latter, but which is normally held clear of the carrier by a spring 53.

The spool 54 for the used coil 3 is of any appropriate construction which allows said coil to be removed intact and which preferably has a larger centre core than the present usual spools. Said spool is preferably rotated from the carrier 1 by a friction wheel 55 touching the surface 4 of the latter and a flexible shaft 56 which connects the spindle of said friction wheel 55 to the spindle 57 on which the spool 54 is fixed; the rotational speed of the spool 54 thus decreasing as the diameter of the film coil 3 on it increases. The film passes through a tension device 58 between the feed sprocket 7 and the spool 54, which device maintains the loop 59 below said sprocket and causes the film to be wound with sufficient tension to make a coherent coil.

The unused coil 2 may be centered and secured in the carrier by the device 60 described in the specification of my prior Patent No. 1,415,131.

The apparatus operates in the following manner. The unused coil 2, which has been wound with its leading end inwards, and with sufficient internal diameter to admit the roller 46, is placed on the carrier 1 and centered and clamped by the device 60. A length of film 35 is withdrawn from the interior of the coil 2, threaded through the ring 36, the projector 8, and the tension device 58 and secured to the core of the spool 54.

The arm 44 is lowered to bring the roller 46 within the coil 2, and the cam 49 is turned over as shown to bring the stop 47 against the head 45.

The clutch 28 is then released, and the drum 23 is rotated by its hand wheel 31 so shifting the carriage 15 until the roller 46 just touches the interior of the coil 2. This sets the friction wheel 5 in the proper position, namely, with its effective driving circumference exactly in line with the first convolution of film. Upon releasing the cam 49, the roller 46 can be pushed free from the coil 2, whilst it still serves as a guide for the inner convolution of film which is being wound off.

The clutch lever 30 is now released, causing the drum 23 to be clutched to its driving gear 27; and the projector is put into motion. The shaft 11 drives the friction wheel 5 through the gears 9, 10 causing the carrier 1 to revolve and deliver films from the interior of the coil 2, whilst the rotation of the drum 23 causes said friction wheel 5 to be traversed radially outwards relatively to the carrier with a motion which keeps its effective driving diameter always substantially under that convolution of the coil from which film is being delivered. Film is thus delivered without tension at a linear speed equal to that of its passage past the projector feed mechanism 7.

Should the loop of film 35 between the coil 2 and the projector 8 tend to increase or decrease during the delivery of the film, the friction wheel 5 is shifted radially with regard to the inner convolution of film by turning the hand wheel 41. This shifts the drum 23 along its shaft 24 and the drum carries with it the pin 19, carriage 15, shaft 6 and friction wheel 5.

However, as it is important in public exhibition of pictures to provide against any possibility of interrupting or impairing perfect projection, the means hereinbefore referred to for making rapid adjustments of the loop 35, should it become abnormal, are provided. Thus a shortened loop can be rapidly lengthened by pressing on the pressure head 18. This compresses the spring 34 and shifts the shaft 6 and friction wheel 5 radially inwards, so causing the carrier 1 to increase its rotational speed. Upon releasing the pressure head 18 the spring 34 brings the carriage 15, shaft 6, pin 19 and friction wheel 5 back to their normal positions. Similarly upon applying the brake 52 the carrier 1 slowed down (the friction wheel 5 slipping), thus permitting an unduly long loop 35 to be rapidly shortened.

Upon projection being completed, the clutch 28 is opened and the drum 23 is rotated to bring the carriage 15 and friction wheel 5 back to the inner point of their travel.

Fig. III is a partial view illustrating another means of carrying out the invention. In this case the carriage 15 is fed outwards by a screw 61, which is driven directly from the carrier 1 and is therefore of even pitch. This view shows the feed screw provided with a star wheel 62, which is rotated intermittently by a dog 63 on the carrier. In this case the absence of permanent driving connection to the feed screw enables the latter to be manually operated to a limited extent while the machine is running, and so permits the clutch 28 to be omitted.

A spring 64 is interposed between a collar 65 on the screw and the fixed part 66 in which the screw is supported. This is equivalent to the spring 34, shown in Fig. II, and permits the screw 61, carriage 15 and friction wheel 5 to be pushed radially inwards for rapidly increasing the film loop 35. As the screw is of uniform pitch the adjustment of the friction wheel in relation to the film coil, which in the Fig. I construction was effected by shifting the drum 23 along its shaft, can be made by rotating the screw and thereby radially adjusting the carriage 15 and friction wheel 5.

I claim—

1. In film delivering or winding apparatus the combination of a rotatable carrier for film coil, continuously variable speed gear for rotating the same and means positively driven with the speed gear for varying the velocity ratio of said gear substantially by equal increments for each revolution of the carrier.

2. In film delivering or winding apparatus, the combination of a rotatable carrier for film coil, a friction wheel driving said carrier and traversable radially over the carrier, and mechanism operating to positively rotate the friction wheel and to positively traverse it radially over the carrier, said mechanism including means whereby the rate of traverse is progressively reduced relatively to the rate of rotation of the friction wheel as said wheel moves away from the centre of the carrier.

3. In film delivering or winding apparatus the combination of a rotatable carrier for film coil, a friction wheel driving the carrier and traversable radially over the carrier, and mechanism operating positively to rotate the friction wheel and to positively traverse it radially over the carrier, said mechanism including a cam through which the traversing motion is transmitted, the cam being shaped to progressively reduce the traversing speed of the wheel in relation to its rotation speed as the wheel moves outwards from the centre of the carrier.

4. In film delivering or winding apparatus, the combination of a rotatable carrier for film coil, a friction wheel driving said carrier and traversable radially relatively thereto, a rotatable member for traversing the friction wheel, and means permitting radial adjustment of said member and the friction wheel together.

5. In film delivering or winding apparatus, the combination of a rotatable carrier for film coil, a friction wheel driving said carrier and traversable radially relatively thereto, a driven shaft, a member splined on said shaft and helically formed to traverse the friction wheel and means to adjust said member along said shaft.

6. In film delivering or winding apparatus, the combination of a rotatable carrier for film coil, a friction wheel driving said carrier and traversable radially relatively thereto, means for traversing the friction wheel, and a resilient abutment interposed between the friction wheel and a fixed part of the apparatus, permitting radial displacement of the friction wheel.

7. In film delivering or winding apparatus, the combination of a rotatable carrier for film coil, a friction wheel driving said carrier and traversable radially relatively thereto, a rotatable drum formed with a feed helix, a pin fixed in relation to the friction wheel and engaging one edge of the helix, and a resiliently mounted member engaging the other edge of the helix.

8. In film delivering or winding apparatus, the combination of a rotatable carrier for film coil, a friction wheel driving said carrier and traversable radially relatively thereto, a rotatable member for traversing the friction wheel, means for rotating said rotatable member including a clutch, and means for opening the clutch to permit the rotatable member to be manually rotated.

9. In film delivering or winding apparatus, the combination of a rotatable carrier for film coil, a friction wheel driving said carrier and traversable radially relatively thereto, means for traversing the friction wheel, a carriage traversable with the friction wheel, an arm on the carriage, a stop on said arm adapted to contact with the carriage to define a limiting position of the radial movement of the arm in one direction, quick acting means for moving said arm to such limiting position and releasing it therefrom and means at the end of the arm to contact with the periphery of a film coil on the carrier.

In testimony whereof I have signed my name to this specification.

EDWARD JOHN WAY.